(12) United States Patent
Flynn et al.

(10) Patent No.: US 9,739,402 B2
(45) Date of Patent: Aug. 22, 2017

(54) ELECTRICALLY CONDUCTIVE SEALS FOR FLUID CONVEYANCE SYSTEMS

(71) Applicants: William T. Flynn, Horton, MI (US); Daniel Gates, Rockaway, NJ (US)

(72) Inventors: William T. Flynn, Horton, MI (US); Daniel Gates, Rockaway, NJ (US)

(73) Assignee: Eaton Corporation, Cleveland, OH (US)

( * ) Notice: Subject to any disclaimer, the term of this patent is extended or adjusted under 35 U.S.C. 154(b) by 964 days.

(21) Appl. No.: 13/783,980

(22) Filed: Mar. 4, 2013

(65) Prior Publication Data

US 2014/0246112 A1 Sep. 4, 2014

(51) Int. Cl.
- *F16L 21/035* (2006.01)
- *F16J 15/06* (2006.01)
- *F16J 15/10* (2006.01)
- *F16L 25/01* (2006.01)

(52) U.S. Cl.
CPC ........... *F16L 21/035* (2013.01); *F16J 15/064* (2013.01); *F16J 15/104* (2013.01); *F16L 25/01* (2013.01); *Y10T 137/6906* (2015.04)

(58) Field of Classification Search
CPC .......... F16J 15/064; F16J 15/104; F16L 25/01
USPC ......... 285/298, 302, 330; 277/603, 619, 627
See application file for complete search history.

(56) References Cited

U.S. PATENT DOCUMENTS

| | | | |
|---|---|---|---|
| 2,477,267 A | | 7/1949 | Robinson |
| 2,796,457 A | * | 6/1957 | Stinger ................ H04B 15/025 174/351 |
| 2,961,713 A | * | 11/1960 | Hartley ............... B29C 33/0022 264/160 |
| 2,966,539 A | * | 12/1960 | Sears ...................... F16L 25/01 138/33 |
| 3,140,342 A | | 7/1964 | Ehrreich et al. |
| 3,347,978 A | | 10/1967 | Simon et al. |

(Continued)

FOREIGN PATENT DOCUMENTS

| | | |
|---|---|---|
| DE | EP 0618387 A1 * 10/1994 | ............. B65D 53/02 |
| DE | 102010015610 A1 * 10/2011 | ............. F16J 15/064 |

(Continued)

OTHER PUBLICATIONS

International Search Report for PCT/US2014/016357 mailed Apr. 28, 2014.

*Primary Examiner* — David E Bochna
(74) *Attorney, Agent, or Firm* — Fishman Stewart PLLC

(57) ABSTRACT

An annular seal for use in a fluid conveyance system that is subject to a high voltage event includes a center core having a generally tubular shape, the core having a circumferentially projected cross-section that is defined by inner and outer core radial surfaces, and core axial surfaces that are opposite one another. The sidewalls each have a generally tubular shape and a circumferentially projected cross-section that is defined by inner and outer sidewall radial surfaces, and first and second sidewall axial surfaces that are opposite one another. The first sidewall is attached along one of its axial surfaces to one of the core axial surfaces, and the second sidewall is attached along one of its axial surfaces to the other of the core axial surfaces. The center core has an electrical resistance that is less than an electrical resistance of each of the first and second sidewalls.

19 Claims, 5 Drawing Sheets

(56) References Cited

U.S. PATENT DOCUMENTS

| | | | | |
|---|---|---|---|---|
| 3,402,253 | A * | 9/1968 | McCracken | F16L 25/01 174/86 |
| 3,775,832 | A * | 12/1973 | Werra | F16J 15/104 277/614 |
| 4,389,340 | A | 6/1983 | Levy | |
| 4,556,591 | A | 12/1985 | Bannink, Jr. | |
| 4,556,592 | A | 12/1985 | Bannink, Jr. | |
| 4,579,248 | A | 4/1986 | Gorges | |
| 4,823,229 | A | 4/1989 | Waterland, III | |
| 4,900,877 | A | 2/1990 | Dubrow et al. | |
| 5,006,666 | A | 4/1991 | Laborie | |
| 5,028,739 | A | 7/1991 | Keyser et al. | |
| 5,551,707 | A * | 9/1996 | Pauley | B32B 25/08 277/654 |
| 5,687,975 | A * | 11/1997 | Inciong | F02F 7/006 277/591 |
| 5,702,111 | A * | 12/1997 | Smith | F16J 15/123 277/650 |
| 5,865,971 | A * | 2/1999 | Sunkara | F16J 15/064 204/280 |
| 6,787,204 | B2 | 9/2004 | Chaussade et al. | |
| 6,857,638 | B2 * | 2/2005 | Dupont | F16J 15/062 277/608 |
| 7,905,498 | B2 | 3/2011 | Dempsey et al. | |
| 8,448,949 | B2 * | 5/2013 | Stewart | F16J 15/064 277/317 |
| 2008/0308677 | A1 | 12/2008 | Kirchoff et al. | |
| 2010/0122749 | A1 * | 5/2010 | Bouleti | A62C 3/08 138/177 |
| 2012/0056416 | A1 | 3/2012 | Briand | |

FOREIGN PATENT DOCUMENTS

| | | | |
|---|---|---|---|
| EP | 0223615 A2 | 5/1987 | |
| EP | 0303349 A2 | 2/1989 | |
| EP | 0685389 A1 | 12/1995 | |
| EP | 1345289 A1 | 9/2003 | |
| JP | WO 2005031195 A1 * | 4/2005 | F16J 15/064 |
| WO | WO-2007064974 A1 | 6/2007 | |
| WO | WO-2008008255 A2 | 1/2008 | |
| WO | WO-2009102371 A2 | 8/2009 | |
| WO | WO-2012/088055 A1 | 6/2012 | |

* cited by examiner

ELECTRICALLY CONDUCTIVE SEALS FOR FLUID CONVEYANCE SYSTEMS

BACKGROUND

Aircraft have numerous systems for conveying fluids, such as air, water, fuel, coolants, and hydraulic fluid as examples. Couplings or retention devices within these systems may include rigid piping, or flexible piping such as tubes, hoses, couplings, and the like. The fluids and systems in which these couplings are used may include a wide range of temperatures and pressures. Exemplary temperatures may range from −70° F. (−56.6° C.) to 275° F. (135° C.), and exemplary pressures may range from −14.5 psig (−0.7 kPa) to +300 psig (14.4 kPa).

To prevent electrical static buildup and also to convey high levels of electrical current during a lightning strike, electrical current flow within fluid conveyance systems is encouraged by designing the components having electrically conductive materials. The fluid conveyance components and systems are electrically bonded to the aircraft's electrical grounding plane. The electrical bonding is typically achieved through the connecting of these fluid conveying components using highly conductive metallic bonding devices including wires, strips, and straps.

The evolution from metallic skinned aircraft to composite skinned aircraft has influenced aircraft manufacturers to replace the highly conductive metallic fluid conveyance systems with composite based systems. These composite systems can include fully composite components or a hybrid of composite and metallic components. The composite components in either system meet electrical conductivity specifications driven by the aircraft's geometry and materials of construction.

The electrical conductivity specification of the fluid conveyance systems for composite aircraft permits replacing the metallic bonding devices with conductive seals for electrical bonding between components. Seals within these systems therefore perform over a wide variety of temperatures and pressures, and are typically used to seal against a wide variety of fluids, while meeting demanding electrical conductivity requirements.

The current conductive seal technology as used as a bonding device meets the performance specifications for specific fluid conveyance systems. However, this current conductive seal technology does not meet the higher voltage lightning specifications for all fluid conveyance systems of the aircraft. It is desirable that these fluid conveyance applications and the conductive seals safely conduct higher potential lightning currents without arcing between components and or between components and aircraft structure.

Arcing has been observed to occur on an outside surface of the conductive seal between highly conductive sealing surfaces at the higher voltage lightning pulses. Reasons for arcing on the outside surface may include, for instance, low surface electrical resistance, ionization of the seal surface due to high current potential coupled with the lightning wave form, high volumetric resistance, very high current density, as examples. Ionization of the seal surface is typically where the initiation or creation of the electrical current path begins.

Some of the seals within aircraft are non-electrically conductive. Thus, at times it is possible for aircraft operator service personnel to place a non-electrically conductive seal within a system, where a conductive seal is required. Such systems would lose their electrical bonding which protects against lightning strikes, as well as static electrical buildup and the dangers inherent therewith.

As such, it would be desirable to have a seal for a fluid conveying system in an aircraft that is distinguishable from non-conductive seals, and resists seal surface ionization when passing a very high current density from a lightning strike.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Figure 1:
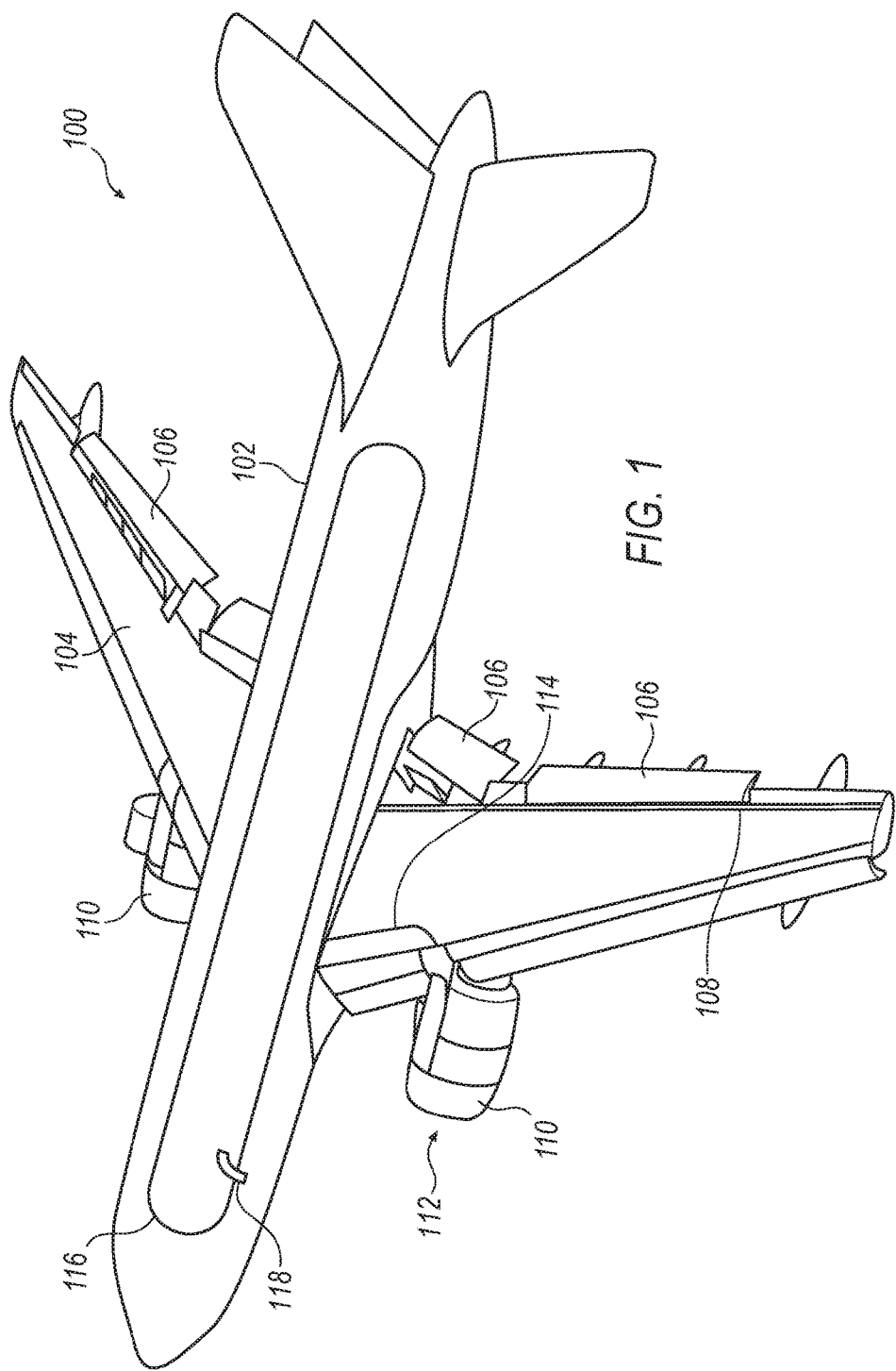
FIG. 1 is an exemplary illustration of an aircraft.

Referring to FIG. 1, aircraft 100 includes a fuselage 102 and wings 104. Control flaps 106 are operated via hydraulic lines 108 to provide maneuvering capabilities to aircraft 100. Engines 110 provide thrust and include air intake 112 and fuel lines 114. A passenger compartment 116 is included in which air is distributed via air handling lines 118 for passenger use and comfort. Lines 108, 114, and 118 thus represent a few of the many lines and line types that are used to convey the numerous types of fluids in an aircraft that can include air, water, fuel, coolants, and hydraulic fluid as examples.

Lines 108, 114, and 118 within aircraft are typically electrically conductive to pass electrical current during a high voltage event (e.g., a lightning strike) and also to dissipate static electrical build-up. As such, the design requirements can be stringent, and can be widely varying in size and pressure requirements, and in the types of chemical or corrosive exposure. Also, lines 108, 114, and 118 typically also include joints (connection points between discrete fluid conveying components) that are provided to simplify maintenance or construction by providing a means to access a relatively short portion of the line. And, although lines 108, 114, and 118 are described and illustrated as in an aircraft, it is contemplated that any environment that is subject to a high voltage event may employ the seals disclosed herein. For instance, electrical junction boxes, electrical components for water towers, etc. may also benefit from that disclosed herein.

Figure 2:
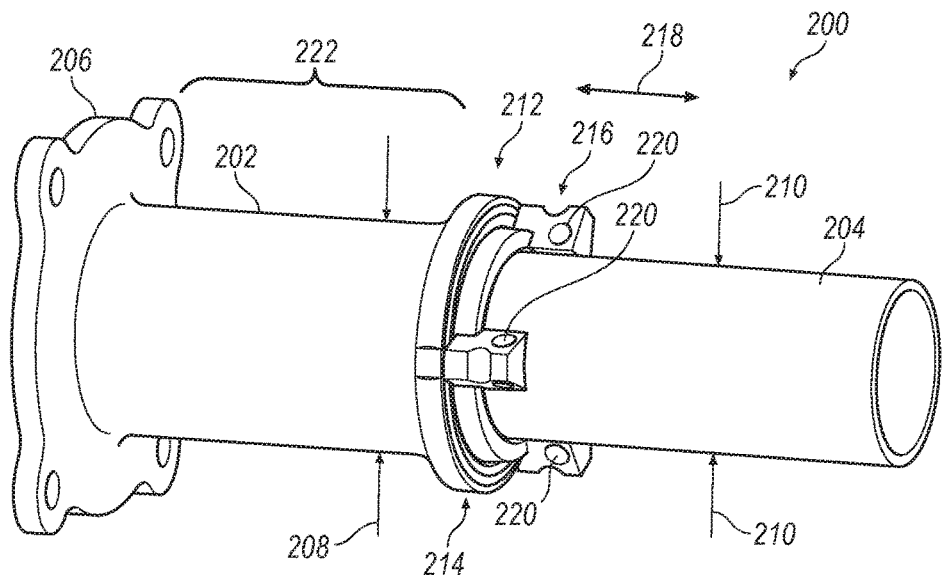
FIG. 2 is an illustration of a tube assembly having a seal region that incorporates one or more seals.

FIG. 2 illustrates a tube assembly 200 that includes a first fluid conveyance conduit or tube 202 and a second fluid conveyance conduit or tube 204. First tube 202 may include a bracket or mounting flange 206, as one example. In another example, first and second tubes 202, 204 extend several feet (or meters) in length, yet in other examples (not shown) first and second tubes 202, 204 can include bends or elbows. First and second tubes 202, 204 may include inner diameters of different dimension to step up or step down a diameter of the flow path. First and second tubes 202, 204 include respective outer diameters 208, 210. Outer diameters 208, 210 may be selected according to required inner diameters and wall thicknesses, based on the type of fluid being conveyed, length of line, flow rate, pressure drop, and the like. As such, outer diameters 208, 210 may be sized such that their respective inner diameters may be less than one inch in diameter, such as ¼" (0.6 cm) in one example, to a few inches (or several centimeters) or more, depending on the application and operating requirements as discussed.

First and second tubes 202, 204 include a retaining mechanism 212 that includes a first flange 214 attached to first tube 202, and a second flange 216 attached to second tube 204, to enable tubes 202, 204 to be connected together providing a means to retain tube 204 within tube 202 in an axial direction 218 that is maintained during operation. In one example, second flange 216 includes holes 220 for weight reduction. Further, it is to be recognized that retaining mechanism 212 is one example of a retaining mechanism for maintaining first and second tubes 202, 204 against one another axially, and it is contemplated that any known retaining mechanism may be used to maintain the axial position between first and second tubes 202, 204.

As will be further illustrated, second tube 204 extends partially within first tube 202 such that an overlap area or region 222 is formed. Overlap region 222 provides axial space or area in axial direction 218 such that one or more seals can be provided between first and second tubes 202, 204.

Figure 3:
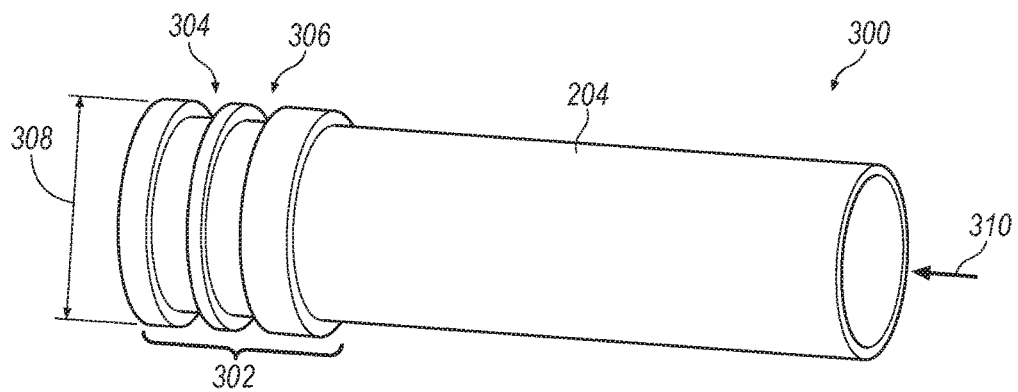
FIG. 3 is an illustration of a tube having slots therein for positioning and retaining seals therein.

Referring now to FIG. 3, tube 300 illustrates second tube 204 of FIG. 2, but without second flange 216 (for simplicity of illustration, moreover second flange 216 may be a separate component from second tube 204 in one illustrative example). Tube 300 includes a seal region 302 that corresponds generally to overlap region 222 of FIG. 2. Seal region 302 includes a first seal gland or slot 304 and a second seal gland or slot 306. Outermost diameter 308 corresponds generally to an inner diameter of first tube 202 (not shown) and within overlap region 222 thereof. Outermost diameter 308 may have its dimension and tolerance selected such that a generally snug fit is formed between the outermost diameter 308 of seal region 302 and its corresponding region of its mated component for forming a seal (i.e., first tube 202). In one illustration a slight positive pressure is formed between inner and outer components in seal region 302 and between outermost diameter 308 and its mating component, which may be press-fit or shrink-fit together. In another exemplary approach adequate clearance is provided such that the parts generally slip together and without interference. Regardless, and as will be subsequently illustrated, a seal is provided within slots 304, 306 such that fluid passing 310 within tube 300, passes therethrough to its mated tube and without leakage outside the assembly.

Figure 4:
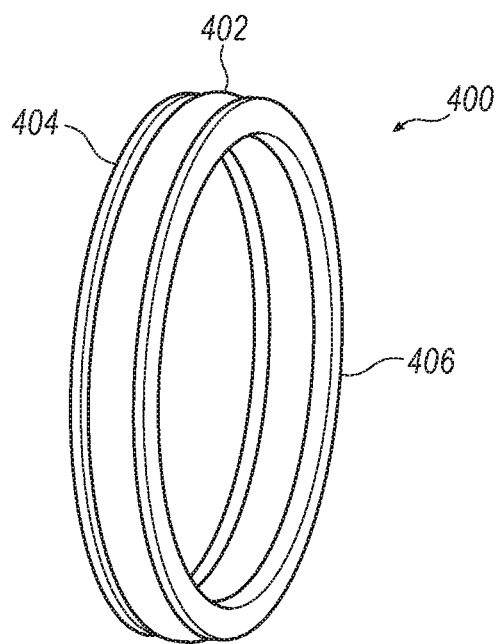
FIG. 4 is a perspective view of a seal having a core material and outer axial jackets, according to one embodiment.

FIG. 4 illustrates an annular seal 400 according to one illustrative example. Seal 400 includes a center core 402 having a generally tubular shape that is jacketed by, or sandwiched in between, a first sidewall or jacket material 404 and a second sidewall or jacket material 406. First and second sidewalls 404, 406 are attached to axial surfaces of center core 402. Center core 402 includes a wall having a material with a first electrical conductivity, and sidewalls 404, 406 include a material having an electrical conductivity that is less than that of center core 402. Center core 402 and first and second sidewalls 404, 406 may be fabricated from an elastomeric material or a polymeric material, that they may be compressed when positioned within slots, such as slots 304, 306 of FIG. 3.

Figure 5:
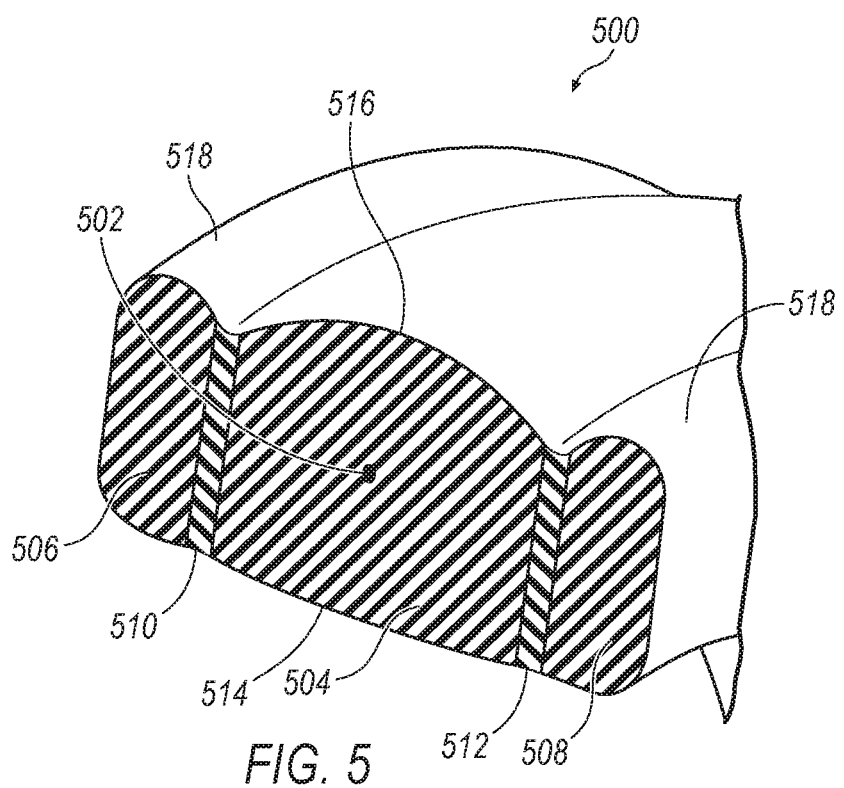
FIG. 5 is a perspective view of a cutaway of a projected cross-section of a seal, according to one embodiment.

FIG. 5 illustrates a cutaway 500 of a perspective view of a portion of a seal, such as seal 400 of FIG. 4. Cutaway 500 includes a circumferentially projected cross-section 502 that illustrates a center core 504, a first sidewall 506 and a second sidewall 508. Cross-section 502 is projected circumferentially to form a generally tubular shape as illustrated in FIG. 4. As stated, core 504 and sidewalls 506, 508 may be fabricated from an elastomeric material or a polymeric material. In the case of an elastomeric, the material may include fluorosilicone, silicone, fluorocarbon, nitrile, and ethylene propylene rubber (EPR), as examples. In the case of a polymeric material, the material may include polytetrafluoroethylene (PTFE), polyether ether ketone (PEEK), polyamide, and acetal, as examples.

Center core 504 includes a material having an electrical conductivity that is greater than that of sidewalls 506, 508. To obtain the desired electrical conductivity, center core 504 is fabricated having a fill of electrically conductive material dispersed within that causes the electrical conductivity of center core 504 to have an increased electrical conductivity as compared to an unfilled core material. That is, the electrical conductivity of the fill causes the bulk electrical conductivity to increase over the inherent electrical conductivity of the core material alone. For instance, the bulk, unfilled electrical resistance of first and second sidewalls 506, 508 in a radial or outwardly extending direction is greater than 10E9 ohms. The fill material may be any powdered metal, such as silver, copper, or nickel, so long as the material itself is approved for aerospace use and so long as the requisite bulk electrical conductivity is achieved when mixed with the core elastomer or polymer. The fill material may also be a non-metallic material such as carbon. Carbon in all its forms may be used, including powder, nanotubes, and grapheme, and any combination thereof, as examples. Other non-metallic and electrically conductive fillers may include conductive silicone powder, conductive glass beads or fibers (plated with silver, gold, or copper for electrical conductivity), or electrically conductive polymers. Although the various materials may achieve the desired electrical conductivity of center core 504, their use may be limited as some materials may have an unacceptably low dielectric strength. A core material having an unacceptably low dielectric strength may breakdown chemically under high voltage lightning pulses.

The various fill options for achieving the conductivity of center core 504 may also be limited by the filler impact on physical properties of the material such as bulk durometer (or hardness), swell, elongation, etc. of center core 504.

The bulk resultant electrical resistance of center core 504 is affected by particle size of the filler. Generally, for a smaller particle size and smaller size range (i.e. Gaussian distribution of particle size), less percentage fill of for instance a carbon powder additive is used to obtain a desired bulk electrical resistance. As one example, seals having 20% by weight of a 4 micron carbon powder (with 2 to 6 micron range at 2 sigma [95%]), may have an installed resistance of approximately 5 to 100 Kohms (and 5 to 10 Kohms in one embodiment) and an 80 durometer at 72° F. While in another example a seal with 30% by weight of 14 micron carbon powder (with 10 to 18 micron range at 2 sigma [95%]) may have a similarly installed electrical resistance of approximately 5 to 10 Kohms and a durometer of 85 at 72° F. Thus, powder size can impact the various material mechanical properties while achieving a similar electrical resistance of the final bulk material. In another example, carbon nanotubes or grapheme may likewise produce a similar bulk electrical resistance using 4% fill, so long as a generally uniform distribution can be achieved.

Surface resistivity may be adversely impacted based on the type and percentage fill of conductive filler. Surface resistance is generally inversely proportional to percentage conductive filler, thus for more filler the surface resistance is decreased, which becomes a moot issue with the addition of the high resistance jackets 506, 508 sandwiched about center core 504.

According to one approach, core 504 and sidewalls 506, 508 may be formed of the same base material, but for the added conductive filler to core 504. For instance, core 504 may be fabricated of silicone and filled with carbon powder, as an example, and sidewalls can likewise be formed of unfilled silicone. However, in other illustrative embodiments the base material of core 504 is different from that of sidewalls 506, 508. For instance, core 504 may include fluorosilicone, and sidewalls 506, 508 may be formed of a polymeric material such as PEEK. In fact, any such combination of a filled core and unfilled sidewalls may be implemented to meet the electrical conductivity requirements as well as the compatibility requirements between materials. That is, typically core 504 is attached to sidewalls 506, 508 by using a heat or chemical process. In one example, when formed together, the materials of core 504 and sidewalls 506, 508 mix to an extent, forming mixture regions 510, 512 which are an integration or mixture of the material of the core and the material of the respective sidewall 506, 508. In another example, the materials of core 504 and sidewalls 506, 508 are mechanically connected such that regions 510, 512 are comprised of an adhesive and or mechanical interlock of core material 504 and sidewall material 506, 508.

As illustrated, cross-section 502 includes an inner radial surface 514 that is generally flat and approximately parallel with the axial orientation of the tubes and slots in which the seal is placed. Cross-section 502 also includes arcuate portions having an arced profile. For instance, center core 504 includes an arced outer profile 516 having a convex outer surface, and each profile of sidewalls 506, 508 also include convex arcuate profiles 518. Projected profile 502, however, is not limited to that illustrated in FIG. 5.

Figure 6:
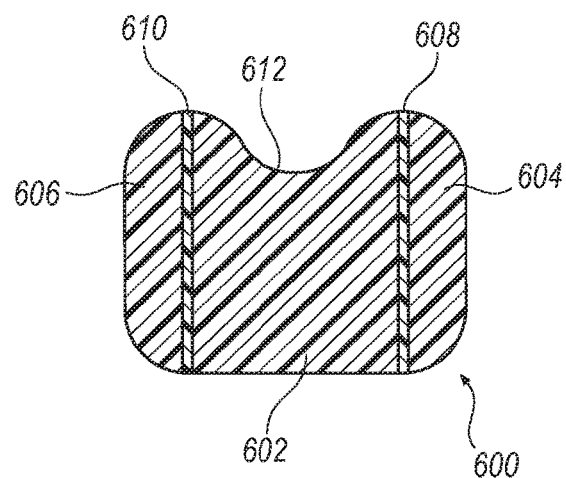
FIG. 6 illustrates an alternative cross-section of a seal, according to another embodiment.

As another example and referring to FIG. 6, profile 600 includes a center core 602 and sidewalls 604, 606, as well as respective mixture regions 608, 610. In this embodiment, polymeric or elastomeric core and sidewalls are included as discussed with respect to FIG. 5, with a filled core for electrical conductivity increase. However, in this example an outer arced profile 612 is outwardly concave (as opposed to outwardly convex as illustrated in FIG. 5). The illustrated projected profiles 502 and 600 can in fact take on any profile or shape, so long as they provide the sealing that is required when positioned and compressed within the slots that form the seal. In such fashion, a unique profile can be selected to uniquely identify the seal for its use. For instance, an air handling unit may have a unique design for its system, and a fuel line may have another unique design for its system. Each system may have a profile dedicated thereto and even including different diameter seals, or each seal itself may have a specific and unique profile. Thus, confusion may be avoided for technicians or maintenance personnel, such that an O-ring, for instance, may not be inadvertently used during a maintenance event.

Figure 7:
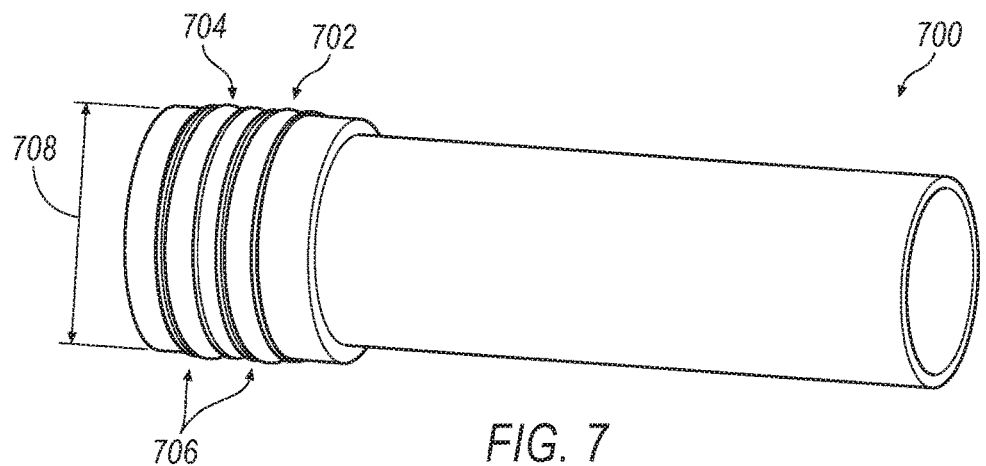
FIG. 7 illustrates a tube having seals positioned within slots thereof.

Referring to FIG. 7, tube 700 is illustrated having conductive seals 702, 704 positioned thereon. As can be seen, seals 702, 704 are positioned within slots and extend radially 706 and slightly outside of diameter 708. Seals 702, 704 are further compressed radially when positioned within a tube, such as tube 300 of FIG. 3.

Figure 8:
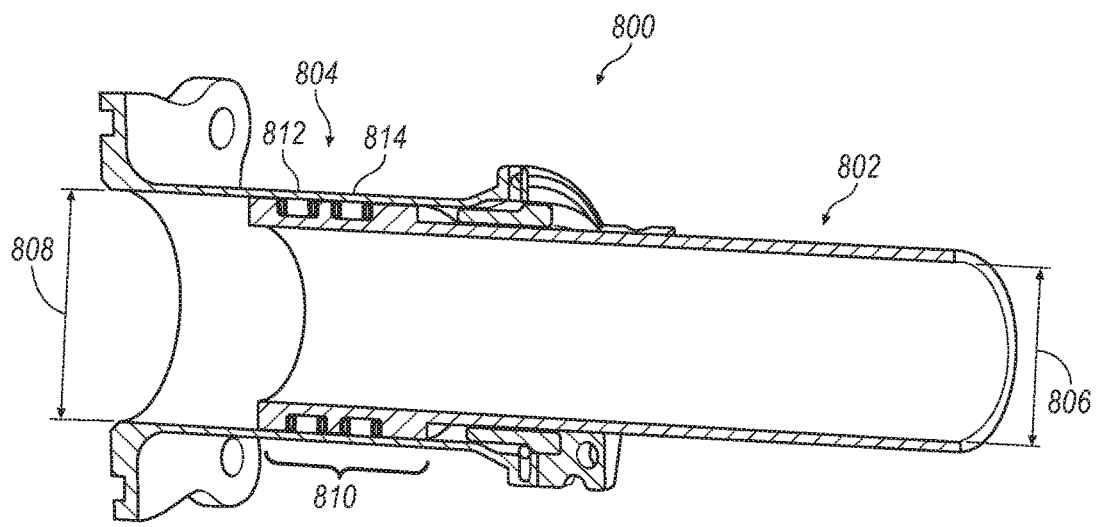
FIG. 8 illustrates a cross-section and cutaway of a completed tube assembly.

FIG. 8 illustrates a cross-section 800 of a completed tube/seal assembly. First tube 802 is positioned within second tube 804. First tube 802 includes an inner diameter 806, and second tube 804 includes an inner diameter 808. Thus, in this exemplary embodiment diameters 806, 808 are different from one another, resulting in a step in size through a seal region 810. Seal region 810 includes a first seal 812 and a second seal 814 that are fabricated as described. As previously stated, each seal 812, 814 may be fabricated of an electrically conductive core and of electrically resistive sidewalls or jackets. As such, when static electrical buildup occurs on one of tubes 802, 804, the static charge is dissipated to the other of tubes 802, 804 via the cores of each seal 812, 814. Further, when a high voltage event occurs, high electrical current therefrom passes through the cores of each seal 812, 814. The high current is prevented from passing along the outer surface of each seal 812, 814 because of the electrically resistive jackets on each axial surface of the cores, which prevents arcing directly between tubes 802 to 804.

FIG. 8 and the preceding examples illustrate two seals positioned within slots of the seal region. However, it is contemplated that only one seal, or many seals, may be used in the seal region. The number of seals may be selected based on the sealing requirements themselves, or may instead be selected based on the electrical performance requirements of the fluid conveyance system. The seals form an electrical conduit from one tube to the other, thus it can be understood that having two seals will generally place them in parallel (electrically) with one another and reduce the overall electrical resistance between the tubes as compared to a single seal. Likewise, adding a third or an nth seal can further effect the overall resistance between the two tubes, such that a desired electrical conductivity between tubes and through the connection can be achieved based on the core electrical resistance of the seal and based on the number of seals used in the seal region.

Figure 9:
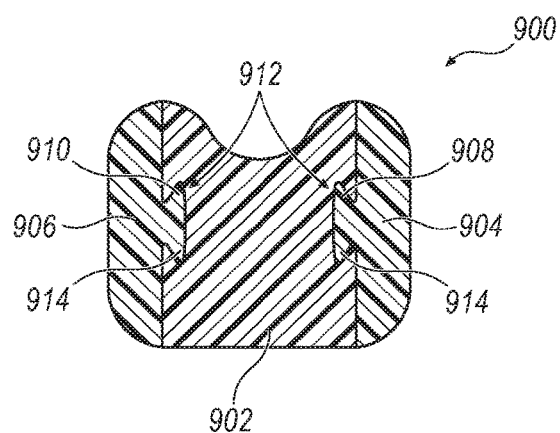
FIG. 9 illustrates an alternative cross-section of a seal, according to another embodiment.

FIG. 9 illustrates another example of a cross-section or profile 900 of a seal, such as annular seal 400 illustrated in FIG. 4. Profile 900 includes a center core 902 and jackets or sidewalls 904, 906. In this example, sidewalls 904, 906 are coupled or attached to center core 902 via respective mechanical interlocks 908, 910. As shown in the example, center core 902 includes voids 912 into which respective extensions 914 are fitted. Voids 912 and extensions 914 are configured, in one example, such that a slight positive or interference fit is obtained therebetween, to lock sidewalls 904, 906 to center core 902. Although voids 912 are positioned within center core 902 and extensions 914 are on sidewalls 904, 906, it is contemplated that the features may be reversed and the voids may instead be in sidewalls 904, 906 and the extensions on center core 902. Further, core 902 could include one extension and one void, with each sidewall having a corresponding void and extension.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

Reference in the specification to "one example," "an example," "one approach," or "an application" means that a particular feature, structure, or characteristic described in connection with the example is included in at least one example. The phrase "in one example" in various places in the specification does not necessarily refer to the same example each time it appears.

What is claimed is:

1. An annular seal for use in a fluid conveyance system that is subject to a high voltage event, the annular seal comprising:
   a center core having a generally tubular shape, the center core having a circumferentially projected cross-section that is defined by an inner core radial surface, an outer core radial surface, and first and second core axial surfaces that are opposite one another; and
   first and second sidewalls each having a generally tubular shape, and each having a circumferentially projected cross-section that is defined by an inner sidewall radial surface, an outer sidewall radial surface, and first and second sidewall axial surfaces that are opposite one another;
   wherein:
      the first sidewall is attached along one of its axial surfaces to one of the core axial surfaces, and the other axial surface of the first sidewall forms one axial end of the annular seal, and the second sidewall is attached along one of its axial surfaces to the other of the core axial surfaces, and the other axial surface of the second sidewall forms another axial end of the annular seal;
      the center core has a fill of electrically conductive material dispersed within a material of the center core such that the center core has an electrical resistance that is less than an electrical resistance of each of the first and second sidewalls; and
      the annular seal is configured to seal between an inner surface of a first conduit and an outer surface of a second conduit, the first and second conduits configured to convey a fluid.

2. The annular seal of claim 1, further comprising:
   a void in one of the center core and the first sidewall; and
   an extension in the other of the center core and the first sidewall;
   wherein the extension is coupled to the void to form a mechanical interlock therebetween, causing the first sidewall to attach to the center core.

3. The annular seal of claim 1, wherein a material of at least one of the center core and the first and second sidewalls comprises one of an elastomeric material and a polymeric material.

4. The annular seal of claim 3, wherein the elastomeric material comprises one of fluorosilicone, silicone, fluorocarbon, nitrile, and ethylene propylene rubber (EPR), and wherein the polymeric material comprises one of polytetrafluoroethylene (PTFE), polyether ether ketone (PEEK), polyamide, acetal, and any combination thereof.

5. The annular seal of claim 1, wherein the electrically conductive material of the fill is carbon.

6. The annular seal of claim 1, wherein the electrical resistance of the center core in a radial direction is between approximately 5 and 100 Kohms, and wherein the electrical resistance of each of the first and second sidewalls in the radial direction is greater than 10E9 ohms.

7. The annular seal of claim 1, wherein the seal is used for an aircraft.

8. The annular seal of claim 1, wherein when the seal is in an uncompressed state, the circumferentially projected cross-section has a non-circular shape.

9. A tube assembly for conveying a fluid in an environment that is subject to a high voltage event, the tube assembly comprising:
   a first tube having an inner diameter;
   a second tube having an outer diameter that is approximately the same as the inner diameter of the first tube, the second tube positioned partially within the first tube;
   a seal positioned between the first and second tubes, wherein an outer surface of the seal is in contact with an inner surface of the first tube, and an inner surface of the seal is in contact with an outer surface of the second tube, the seal comprising a core material jacketed on axial surfaces of the core material by a jacket material having an electrical resistance that is greater than an electrical resistance of the core material, one of the core material and the jacket material having a void, and the other of the core material and the jacket material having an extension coupled to the void to form a mechanical interlock therebetween, causing the jacket material to attach to the core material, and wherein the first and second tubes are configured to convey a fluid.

10. The tube assembly of claim 9, wherein at least one of the first and second tubes comprises a slot in which the seal is configured to be positioned and compressed to cause a fluid seal to form between the first and second tubes, such that an electrically conductive joint is also formed between the first tube and the second tube via the core material.

11. The tube assembly of claim 9, further comprising a second seal positioned between the first and second tubes, wherein an outer surface of the second seal is in contact with the inner surface of the first tube, and an inner surface of the second seal is in contact with the outer surface of the second tube, the second seal comprising a second core material jacketed on axial surfaces of the second core material by jacket materials having an electrical resistance that is greater than an electrical resistance of the second core material.

12. The tube assembly of claim 11, wherein the electrical resistance of the first and second core materials in a radial direction is between approximately 5 and 100 Kohms, and wherein the electrical resistance of the jacket materials of each of the second seals in the radial direction is greater than 10E9 ohms.

13. The tube assembly of claim 11, wherein the fluid is conveyed within an aircraft.

14. The tube assembly of claim 9, wherein the core material comprises a carbon filler dispersed within the material of the center core comprising a powder, nano tubes, a grapheme, and any combination thereof.

15. The tube assembly of claim 9, wherein:
the core material comprises a generally tubular shape, the core material having a circumferentially projected cross-section that is defined by the inner surface of the seal and the outer surface of the seal, and by its axial surfaces that are opposite one another; and
the jacket materials each include a generally tubular shape and a circumferentially projected cross-section that is defined by an inner sidewall radial surface, an outer sidewall radial surface, and first and second sidewall axial surfaces that are opposite one another.

16. A fluid conveyance system for an aircraft comprising:
a piping system comprised of at least two tubular fluid conveyance conduits for conveying the fluid; and
a seal positioned between two of the conduits, the seal configured to contact a radially inner surface of one of the conduits and a radially outer surface of the other of the conduits, the seal comprising a core material sandwiched between two outer layers, wherein each of the two outer layers is in contact with respective axial surfaces of the core material;
wherein the core material has an electrical resistance that is less than an electrical resistance of a material of each of the two outer layers;
wherein the core material has a generally tubular shape, the core material having a circumferentially projected cross-section that is defined by an inner surface of the seal and an outer surface of the seal, and by the axial surfaces of the core material that are opposite one another; and
wherein the two outer layers each includes a generally tubular shape and a circumferentially projected cross-section that is defined by an inner sidewall radial surface, an outer sidewall radial surface, and first and second sidewall axial surfaces that are opposite one another.

17. The fluid conveyance system of claim 16, further comprising another seal positioned between the two conduits, the another seal configured to contact the radially inner surface of the one conduit and the radially outer surface of the other of the conduits, the another seal comprising a second core material sandwiched between two outer layers, wherein each of the two outer layers of the second core material is in contact with an axial surface of the second core material, wherein the second core material has an electrical resistance that is less than an electrical resistance of a material of each of the two outer layers of the second core material.

18. The fluid conveyance system of claim 16, wherein the electrical resistance of the core material in a radial direction is between approximately 5 and 100 Kohms, and wherein the electrical resistance of each of the two outer layers in the radial direction is greater than 10E9 ohms.

19. The fluid conveyance system of claim 16, wherein when the seal is in an uncompressed state, a cross-section of a wall of the seal has a non-circular shape.

* * * * *